R. J. SMITH.
DRILL.
APPLICATION FILED MAY 29, 1909.
988,903.
Patented Apr. 4, 1911.
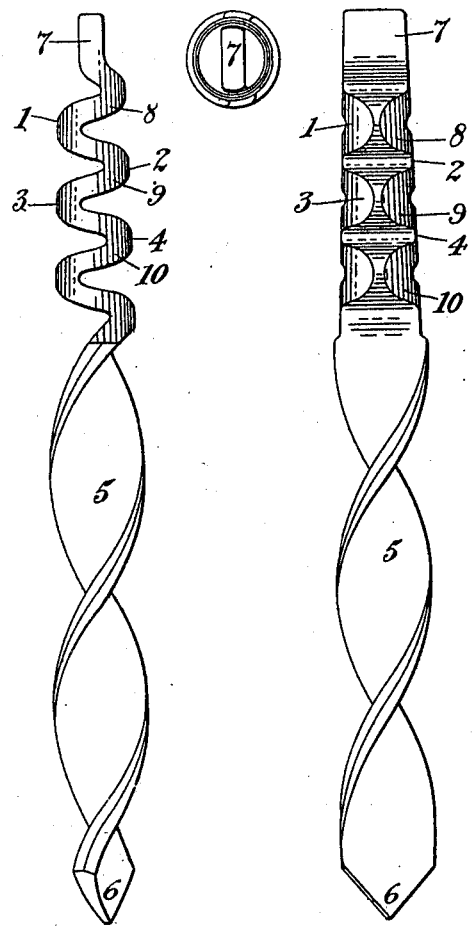
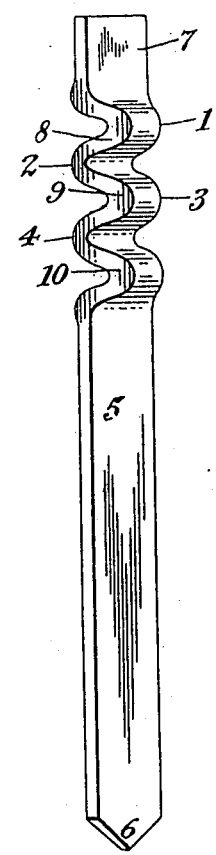

UNITED STATES PATENT OFFICE.

ROBERT J. SMITH, OF YONKERS, NEW YORK, ASSIGNOR OF ONE-HALF TO HIO P. EILERS, OF NEW YORK, N. Y.

DRILL.

988,903.  Specification of Letters Patent.  Patented Apr. 4, 1911.

Application filed May 29, 1909. Serial No. 499,090.

*To all whom it may concern:*

Be it known that I, ROBERT J. SMITH, of Yonkers, New York, have invented certain new and useful Improvements in Drills, of which the following is a specification, reference being had to the accompanying drawings.

This invention relates to that class of drills, which is made of more or less flattened stock as distinguished from that class which is made from round stock.

In the drawings, Figure 1 is a side view; Fig. 2 a top view of a drill embodying my invention. Fig. 3 is an end view of the shank; and Fig. 4 a perspective view of the same.

Similar reference letters indicate like parts in the several figures.

In the manufacture of drills it has been found desirable to make the drill from flattened stock, since a better quality of metal is thus obtained at the point of the drill when finished, and such drills have been made by using a flattened bar to form the body portion of the drill. In this method of manufacture it has been found difficult to secure the flat shank in chucks of ordinary construction, because of its thinness, and it has been usual to secure upon opposite sides of the flat shank separate pieces of metal to build the shank out so as to make it of circular transverse section. This method is however difficult and expensive.

I make my improved drill by bending or corrugating the shank portion thereof. The bends or corrugations being transverse to the flat side of the shank, as is shown at 1, 2, 3, 4, of the drawings. By this means practically the same effect is produced as if the shank was made of stock as thick as the distance across the corrugations or bends, so that the corrugated sides of the drill shank may be turned or ground and will afford a gripping or holding surface, much broader than could have been obtained from the stock, before bending or corrugating it. In fact, if desired, the corrugations or bends may be as deep as the width of the stock, as shown at 1, Fig. 2. In this case the resultant corrugated shank can be ground or turned to give a gripping or holding contact around the entire circle. This however will not be necessary since a sufficient grip or hold can be obtained if the corrugations are not made so deep proportionally, but are of less depth than the width of the stock, as is indicated at 4, Fig. 2, or even from two-thirds to one-half the width of the stock.

The two common forms of drill shanks are those called, " straight " and " taper," which may also be described as cylindrical and conical. For the purpose of my invention it is of no consequence whether the drill shank is finally made straight or taper, and the shank may be ground or turned to either form as desired without departing from the spirit of my invention.

The body or blade, 5, of the drill may be either twisted as is shown in Figs. 1 and 2, or flat as shown in Fig. 4. The end of the drill shank, 7, called the tang, should be in the axis of the bends or corrugations, as shown in Fig. 1. This in the flat form shown in Fig. 4, would be the plane of the body 5, of the drill.

I claim:

1. A drill, having a corrugated shank.
2. A drill, having a flat corrugated shank.
3. A drill, having its shank provided with a series of alternately opposed transverse bends.
4. A drill, having a corrugated shank and a twisted body portion.
5. A drill, having a flat corrugated shank and a twisted body portion.
6. A drill, having its shank provided with a series of alternately opposed transverse bends and a twisted body portion.
7. A drill, having a corrugated shank integral with its body portion.
8. A drill, having a flat corrugated shank integral with its body portion.
9. A drill, having a shank provided with a series of alternately opposed transverse bends and a twisted body portion integral therewith.
10. A drill, having a corrugated shank the sides thereof being rounded.
11. A drill, having a flat corrugated shank, the sides thereof being cut or ground to circular arcs.
12. A drill, having a flat corrugated shank, the sides thereof being cut or ground to circular arcs and a twisted body portion.
13. A drill, having a corrugated shank terminated by a centrally disposed tang.
14. A drill, having a flat corrugated shank terminated by a centrally disposed tang.

15. A drill, having a flat corrugated shank, and centrally disposed tang both integral with the body of the drill.

16. A drill, having a flat corrugated shank, whose sides are circular arcs and a centrally disposed tang.

17. A twist drill formed from a twisted bar and having a shank formed with a zigzag bend therein.

18. A twist drill formed from a twisted bar and having a tapered shank, said shank having a bend therein, in which bend there is a plurality of deflections of direction.

ROBERT J. SMITH.

Witnesses:
 CHAS. D. KING,
 FREDERICK I. ALLEN.

Copies of this patent may be obtained for five cents each, by addressing the "Commissioner of Patents, Washington, D. C."